(12) United States Patent
Reddy

(10) Patent No.: US 10,202,537 B1
(45) Date of Patent: Feb. 12, 2019

(54) CEMENT COMPOSITIONS COMPRISING HIGH VISCOSITY ELASTOMERS ON A SOLID SUPPORT

(71) Applicant: Saudi Arabian Oil Company, Dhahran (SA)

(72) Inventor: B. Raghava Reddy, Pearland, TX (US)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/870,489

(22) Filed: Jan. 12, 2018

(51) Int. Cl.
*E21B 33/13* (2006.01)
*C09K 8/467* (2006.01)
*C04B 16/10* (2006.01)

(52) U.S. Cl.
CPC .............. *C09K 8/467* (2013.01); *C04B 16/10* (2013.01); *E21B 33/13* (2013.01)

(58) Field of Classification Search
None
See application file for complete search history.

(56) References Cited

U.S. PATENT DOCUMENTS

| | | | |
|---|---|---|---|
| 5,135,577 A | 8/1992 | Brothers | |
| 5,264,506 A | 11/1993 | Eisinger et al. | |
| 6,516,884 B1 | 2/2003 | Chatterji et al. | |
| 7,143,828 B2 | 12/2006 | Reddy et al. | |
| 7,294,194 B2 | 11/2007 | Reddy et al. | |
| 7,402,204 B2 | 7/2008 | Le Roy-Delage et al. | |
| 7,645,817 B2 | 1/2010 | Reddy et al. | |
| 7,650,940 B2 | 1/2010 | Reddy et al. | |
| 8,240,377 B2 | 8/2012 | Kulakofsky et al. | |
| 2007/0151730 A1* | 7/2007 | Reddy | C04B 16/04 166/293 |
| 2009/0176667 A1* | 7/2009 | Nguyen | C09K 8/70 507/204 |
| 2011/0028593 A1* | 2/2011 | Roddy | C04B 24/26 523/130 |
| 2011/0077324 A1 | 3/2011 | Ravi et al. | |
| 2011/0098202 A1* | 4/2011 | James | C04B 26/02 507/225 |
| 2014/0305646 A1 | 10/2014 | Chew et al. | |
| 2015/0129217 A1* | 5/2015 | Vorderbruggen | E21B 33/13 166/294 |

FOREIGN PATENT DOCUMENTS

EP    0856531 A2    8/1998

* cited by examiner

*Primary Examiner* — Andrew Sue-Ako
(74) *Attorney, Agent, or Firm* — Bracewell LLP; Constance Gall Rhebergen

(57) ABSTRACT

A composition forming a free-flowing cement additive, the composition comprising a high viscosity elastomer, the high viscosity elastomer having a viscosity between 50,000 cP and 300,000 cP at room temperature; and an inert support, where the high viscosity elastomer is deposited on the inert support.

13 Claims, 1 Drawing Sheet

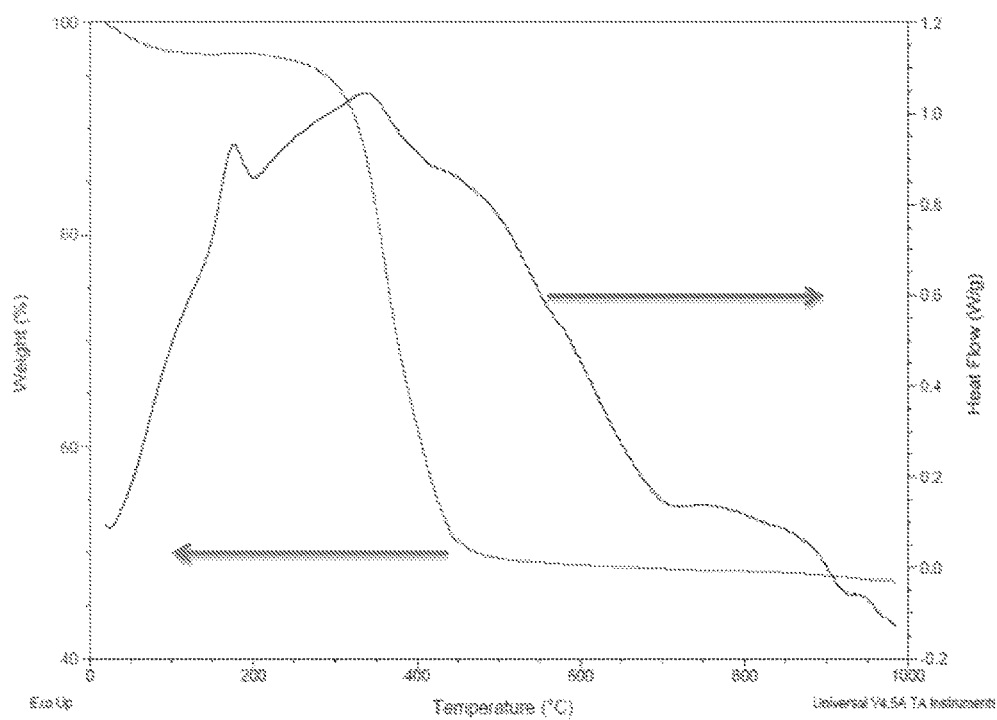

CEMENT COMPOSITIONS COMPRISING HIGH VISCOSITY ELASTOMERS ON A SOLID SUPPORT

TECHNICAL FIELD

Disclosed are compositions and methods for use in cementing operations. Specifically, disclosed are compositions and methods for enhancing set cement properties in a downhole environment.

BACKGROUND

Upon completion of drilling a well, cement slurries are pumped down the hole, and placed in the annulus between a casing pipe and subterranean formation, or between two casing strings. The cement slurry upon setting can isolate the cemented formation zones and can prevent fluid communication (often referred to as zonal isolation) between the cemented zones, or between the formation and the wellbore annulus. However, the cement sheath, during the production phase of the well, is subjected to a variety of stresses from the wellbore side, such as cyclic pressure and temperature changes, fluid density changes, stimulation operations such as perforations, fracturing, acidizing and remedial operations. As a result, the cement may develop cracks and fractures which can provide conductive pathways or channels, through which formation fluids can flow into, accumulate, and build pressure at the well head. Because of the hazards posed by such situations, wells may need to be shut down until successful remedial operations such as squeeze cementing, or settable resin injection are carried out. The success of such remedial operations is not always assured or predictable.

Current approaches to develop cement compositions which are, primarily, resistant to cyclic stresses and sudden impact events during the life of the well, and secondarily to self-heal in case of cracking under stress are complex or only mildly effective. For example, some approaches to improve cyclic stress resistance of cement compositions include using foamed cement slurries, which require highly specialized equipment such as cryogenic equipment to supply nitrogen. Other approaches such as inclusion of particulate elastomers, while representing a simpler solution, suffer from problems such as poor adhesion between cement and liquid elastomer, phase separation in the slurry, or difficulties in obtaining in suitable particle sizes.

SUMMARY

Disclosed are compositions and methods for use in cementing operations. Specifically, disclosed are compositions and methods for enhancing set cement properties in a downhole environment.

In a first aspect, a composition forming a free-flowing cement additive is provided. The composition includes a high viscosity elastomer, the high viscosity elastomer having a viscosity between 50,000 centiPoise (cP) and 300,000 cP at room temperature, and an inert support, where the high viscosity elastomer is deposited on the inert support.

In certain aspects, the high viscosity elastomer includes a liquid elastomer. In certain aspects, the liquid elastomer includes a low molecular weight polymer, where the low molecular weight polymer includes butadiene. In certain aspects, the low molecular weight polymer includes polar groups selected from the group consisting of polar monomers, polar functional groups, and combinations of the same. In certain aspects, the low molecular weight polymer includes polar monomers selected from the group consisting of acrylonitrile, maleic anhydride, vinyl acetate, and combinations of the same. In certain aspects, the polar monomer is incorporated into a backbone of the low molecular weight polymer. In certain aspects, the polar monomer is grafted onto a backbone of the low molecular weight polymer. In certain aspects, the low molecular weight polymer includes the polar functional group selected from the group consisting of carboxylate groups, hydroxyl groups, carboxy anhydride groups, ester groups, sulfonate groups, phosphonate groups, and combinations of the same. In certain aspects, the low molecular weight polymer is chain-end terminated with the polar functional group. In certain aspects, the inert support is selected from the group consisting of sand, quartz, amorphous silica, alumina, clays, fly ash, minerals, salts, and combinations of the same. In certain aspects, the free-flowing cement additive further includes a supplemental component selected from the group consisting of an emulsifier, a hydrocarbon solvent, and combinations of the same. In certain aspects, the free-flowing cement additive includes a median particle size (D50) distribution of less than 500 microns.

In a second aspect, a method of making a free-flowing cement additive is provided. The method includes the steps of heating a high viscosity elastomer to a temperature greater than or equal to 140 degrees Fahrenheit (deg F.) to form a pre-heated elastomer, adding an amount of the pre-heated elastomer to inert support to form an intermediate mixture, where the inert support is agitated while the amount of the pre-heated elastomer is added, and hot rolling the intermediate mixture for a time period at a hot roll temperature to form the free-flowing cement additive, where the free-flowing cement additive has an active elastomer content.

In certain aspects, the method further includes the step of adding a supplemental component to the inert support to produce a dry support powder. In certain aspects, the time period is less than 30 hours. In certain aspects, the hot roll temperature is 180 deg F. In certain aspects, the active elastomer content is at least 25 percent (%) by weight of the free-flowing cement additive.

In a third aspect, a method of making a cement slurry for downhole cementing applications is provided. The method includes the steps of blending an amount of a free-flowing cement additive with a cement to form a dry cement mix, and mixing the dry cement mix with an aqueous fluid to form the cement slurry.

In certain aspects, the cement is selected from the group consisting of Portland cements, high alumina cements, magnesia cements, pozzolanic cements, and slag cements. In certain aspects, the cement slurry further includes a cement additive selected from the group consisting of a set retarders or accelerators, fluid loss control agents, gas migration control additives, settling prevention addition additives, strength retrogression prevention additives, mechanical property modifiers, fibers, foaming agents, defoamer additives, and combinations of the same.

In a fourth aspect, a method of using a cement slurry in a downhole cementing application. The method includes the steps of blending an amount of a free-flowing cement additive with a cement to form a dry cement mix, mixing the dry cement mix with an aqueous fluid to form the cement slurry, placing the cement slurry in a wellbore in the downhole cementing application, and allowing the cement slurry to set to form a hardened cement.

In certain aspects, the downhole cementing application is selected from the group consisting of primary cement operations, annulus sealing operations, and combinations of the same.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

FIG. 1 provides a graph from the Thermal Gravimetric Analysis (TGA) of Example 1.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The compositions and methods are directed to compositions of free-flowing cement additives. The free-flowing cement additives provide a method for adding a high viscosity elastomer to cement compositions, where the high viscosity elastomers alone or in pure form are not pourable and cannot be homogenously mixed, in liquid state, into cement slurry compositions.

Advantageously, the free-flowing cement additives described here enhance the mechanical properties of the cement, such as by reducing the elastic modulus, improving the tensile strength, and improving the compressive strength. Reducing the elastic modulus of cement reduces the cement brittleness, which is an advantage in cementing zones that produce gas with gas flow potentials and formation gas pressures in ranges that can cause concern for production. Advantageously, the free-flowing cement additive can improve the self-sealing ability of the set cement. Advantageously, the high viscosity elastomer in the free-flowing cement additive can flow into cracks and fractures in the cement and interfacial debonded areas, such as cracks in the cement column, microannulus at the casing to cement interface, and microannulus at the cement to cement interface and seal such flow pathways, rendering the cement self-healing. Advantageously, the high viscosity elastomer in the free-flowing cement additive can absorb and dissipate imposed stresses better than solid elastomers, because the high viscosity elastomer can deform to accommodate stresses. Advantageously, the free-flowing cement additives add stress-resistant properties, impact resistant properties, and self-sealing properties to set cements and provide improved zonal isolation. Advantageously, the free-flowing cement additives can improve the performance of the set cement over the life time of the well. Stress-resistance improves the life of the set cement under the downhole conditions due to the stresses placed on the set cement due to the pressure conditions in the well, including the changing pressure conditions during the course of production. Self-sealing properties enables set cement to maintain or retain the stress-resistance and flow blocking abilities in the event of a fracture or crack in the cement; in some instances the presence of the latex cement additives can seal or close those fractures or cracks.

As used throughout, "deposited" means placing or coating a liquid material onto a solid surface by any mechanical means, which can include spray coating, dropping the liquid onto solid surface that is agitated or tumbled in a mixer, or fluidized with a gas, or that is placed on a moving conveyor belt. The term deposited can include the process of mixing a liquid with a solvent, to render the liquid a thinner fluid, and coated onto a solid with the solvent removed, leaving compounds of the liquid attached on the solid.

As used throughout, "high viscosity elastomer" refers to liquid elastomers which are liquid at room temperature with viscosities in the range from 50,000 cP to 300,000 cP at room temperature, alternately in the range from 50,000 cP to 200,000 cP, and alternately between 100,000 cP and 200,000 cP. Due to their viscosities, the high viscosity elastomers are not pourable at room temperature. The high viscosity elastomer contains only liquid elastomer and does not contain water or an aqueous fluid.

As used throughout, "liquid elastomer" refers to low molecular weight polymers having molecular weights in the range of 1,000 to 250,000 Daltons (Da) and exist in liquid state at room temperature. The low molecular weight polymers can include butadiene monomer and combinations of butadiene monomer and between one and three additional monomers. In at least one embodiment, the low molecular weight polymer is a homopolymer including butadiene monomer alone. In at least one embodiment, the low molecular weight polymer is a copolymer including butadiene and between one and three additional monomers. The additional monomers in the copolymer can be incorporated into the backbone of the polymer chain, alternately grafted onto the polymer backbone, and alternately incorporated at the ends of the polymer chain. For example, the butadiene monomer can polymerize by 1,4 addition during chain growth, leading to liquid elastomers containing 2-butene groups, alternately the butadiene monomer can polymerize by 1,2-addition during chain growth, leading to liquid elastomers containing vinyl groups. Examples of the additional monomers can include polar monomers, non-polar monomers, and combinations of the same. Examples of polar monomers can include acrylonitrile, maleic anhydride, vinyl acetate, and combinations of the same. Examples of non-polar monomers can include styrene, alpha-methylstyrene, propylene, and combinations of the same. The low molecular weight polymers can be chain-end terminated with polar functional groups. Examples of polar functional groups can include carboxylate groups, hydroxyl groups, carboxy anhydride groups, ester groups, sulfonate groups, phosphonate groups, and combinations of the same. The polar groups from the polar monomers and polar functional groups are capable of binding with or adsorbing onto cement surfaces. The polar groups from the polar monomers and polar functional groups can have a binding affinity for polyvalent metal ions and hydroxyl groups present in the cement and subterranean formation surfaces. Examples of polyvalent metal ions can include calcium, magnesium, aluminum, and combinations of the same. Examples of the hydroxyl groups can include silanol groups with the form R—Si—OH. Due to the polar groups, the liquid elastomers can adhere to metal surfaces, cement surfaces, and both metal and cement surfaces.

As used throughout, "median particle size (D50) distribution" refers to the diameter, or equivalent diameter, at which 50% of a sample's mass is composed of smaller particles. The median particle size distribution can be determined by sieves and alternately from other means known in the industry.

The free-flowing cement additive described here include a high viscosity elastomer and an inert support.

Examples of the high viscosity elastomer include liquid elastomers.

The inert support can be any type of inorganic solid support on which a high viscosity elastomer can be deposited. Examples of the inorganic solid support can include sand, quartz, amorphous silica, alumina, clay, fly ash, minerals, salts, and combinations of the same. In at least one embodiment, the inert support can be a silica powder support with a porous precipitated silica capable of absorbing aqueous or non-aqueous liquids up to twice their weight, and remain as free flowing powders. Examples of commercially available porous precipitated silica materials are available from Evonik Corporation, USA, under the trade name SIPERNAT®. In at least one embodiment, the inert support can be any type of solid support capable of reacting with calcium hydroxide formed in cement hydration, such that calcium silica hydrate is formed which will increase the binding phase and thereby the compressive and tensile strengths of the composition. The inert support can be particles, having a median particle size (D50) distribution, of less than 500 microns.

The free-flowing cement additive can further include a supplemental component. The supplemental component can include an emulsifier, a hydrocarbon solvent, and combinations of the same.

The free-flowing cement additive can have an active liquid elastomer content of greater than 25% by weight of the free-flowing cement additive, alternately greater than 30% by weight of the free-flowing cement additive, alternately greater than 35% by weight of the free-flowing cement additive, alternately greater than 60% by weight of the free-flowing cement additive. The active elastomer content can be measured by thermal gravimetric analysis. The free-flowing cement additive can have a particle size distribution of between 5 microns and 1000 microns. In at least one embodiment, the free-flowing cement additive can have a median particle size (D50) distribution of equal to or less than about 500 microns.

The free-flowing cement additive can be formed by adding the high viscosity elastomer to the inert support. In a method of making the free-flowing cement additive, the high viscosity elastomer can first be heated to a temperature greater than or equal to 140 deg F., alternately greater than or equal to 150 deg F., and alternately greater than or equal to 160 deg F. to produce a pre-heated elastomer. Heating the high viscosity elastomer to a temperature greater than or equal to 140 deg F. produces a pre-heated elastomer with decreased viscosity and increased pourability. After heating, an amount of the pre-heated elastomer can be deposited on the inert support to form an intermediate mixture. While the high viscosity elastomer is being deposited on the inert support, the vessel containing the inert support can be agitated to enhance interaction between the high viscosity elastomer and inert support. Methods of agitation can include rolling, shaking and mixing. The agitation can be constant or intermittent. In a next step, the intermediate mixture can be hot rolled at a hot roll temperature for a time period. The hot roll temperature can be at least 140 deg F., alternately at least 150 deg F., alternately at least 160 deg F., alternately at least 170 deg F., and alternately at least 180 deg F. In at least one embodiment, the hot roll temperature is 180 deg F. The hot roll temperature can start at one point and be increased to a second temperature. The time period can be at least 3 hours, alternately at least 5 hours, alternately at least 10 hours, alternately at least 15 hours, alternately at least 20 hours, and alternately less than 30 hours. The time period for hot rolling should continue until the free-flowing cement additive is produced that does not contain lumps, chunks, or agglomerated particles.

In at least one embodiment, a step of adding a supplemental component can occur before the step of adding the amount of the high viscosity elastomer to the inert support. The supplemental component can be added dropwise to the vessel containing the inert support. While the supplemental component is added to the vessel containing the inert support, the vessel can be agitated. The result is a dry support powder. The high viscosity elastomer can then be added to the dry support powder according to the method of making the free-flowing cement additive.

The free-flowing cement additives can be dry blended with cement to form a dry cement mix. The cement can be any cement capable of being used in downhole cementing applications. Examples of cements can include Portland cements, high alumina cements, magnesia cements, pozzolanic cements, and slag cements. In at least one embodiment, the cement is a Portland cement, where the Portland cement is a Class G cement.

The dry cement mix can be mixed with an aqueous fluid to form a cement slurry. Examples of the aqueous fluid can include fresh water and salt water. The cement slurry can include cement additives. Examples of cement additives include a cement dispersant, set retarders or accelerators, fluid loss control agents, gas migration control additives, settling prevention addition additives, strength retrogression prevention additives, mechanical property modifiers, fibers, foaming agents, defoamer additives, and combinations of the same. The inclusion of cement additives can be based on the composition of the cement and the conditions in the wellbore. The amount of free-flowing cement additive can result in a cement slurry having an amount of high viscosity elastomer in the range of between 1% by weight of cement and 20% by weight of cement.

The cement slurry compositions can be used in downhole cementing applications. Examples of downhole cementing applications include primary cementing operations and annulus sealing operations. Annulus sealing operations can include sealing an annulus between a casing and a formation, alternately between two casings, and alternately between a casing and a liner. The cement slurry compositions can be pumped into the wellbore for use in a downhole cementing application and allowed to set to form a hardened cement. In at least one embodiment, the downhole cement application is cementing a wellbore annulus by placing the cement slurry into the wellbore annulus behind a casing and allowing the cement slurry to set to form a hardened cement.

EXAMPLES

In the Examples, the polybutadiene chain-end terminated with carboxylate groups was obtained from Sigma Aldrich Chemical Company (St. Louis, Mo.).

Example 1

In Example 1, the inert support was a commercially available precipitated silica, SIPERNAT® 22 from Evonik Corporation (Parsippany, N.J.). The high viscosity elastomer was a polybutadiene chain-end terminated with carboxylate groups.

Five grams of the inert support was taken in a glass jar to which five grams of the high viscosity elastomer warmed to 160 deg F. was added with frequent shaking. The intermediate mixture was a lumpy material and was hot rolled at 140 deg F. for 3 hours. Visual observation after 3 hours indicated the intermediate mixture was still a lumpy material. The hot rolling temperature was increased to 180 deg F. and hot rolling continued for an additional 24 hours. After 27 hours, the result was the free-flowing cement additive. The active elastomer content was 50 percent by weight of free-flowing cement additive. The results from Thermal Gravimetric Analysis (TGA) on Example 1 are shown in FIG. 1. The weight loss data in FIG. 1 shows that the free-flowing cement additive has 50 wt % volatile organic content (weight loss up to 400 degrees Celsius (deg C.)) confirming that the high viscosity elastomer was distributed evenly on the silica support.

Example 2

In Example 2, the inert support was a commercially available precipitated silica, SIPERNAT® 22 from Evonik Corporation (Parsippany, N.J.). The high viscosity elastomer was a polybutadiene chain-end terminated with carboxylate groups. The commercially available emulsifier was an anionic emulsifier available under the trade name Latex Stabilizer-RS from RITEKS Corporation (McKinney, Tex.).

To two grams of the inert support in a glass container, 0.5 milliliters (mL) of the anionic emulsifier was added dropwise while shaking to obtain a dry support powder. To the silica powder, 1.04 grams (g) of the high viscosity elastomer at a temperature of 140 deg F. was added with frequent shaking. The intermediate mixture was hot rolled at 140 deg F. for three hours and then the temperature was increased to 180 deg F. Continued hot rolling for 20 hours resulted in the free-flowing cement additive with no lumps. The active liquid elastomer content was 29% by weight of free-flowing cement additive.

Example 3

In Example 3, the inert support was a commercially available precipitated silica, SIPERNAT® 22 from Evonik Corporation (Parsippany, N.J.). The high viscosity elastomer was a polybutadiene chain-end terminated with carboxylate groups. The commercially available hydrocarbon solvent was Shell GTL Saraline 185V available from Shell Corporation (The Hague, The Netherlands).

To two grams of the inert support in a glass container, 0.5 mL of the hydrocarbon solvent was added to obtain a dry support powder. To the silica powder, 1.24 g of the high viscosity elastomer at a temperature of 140 deg F. was added with frequent shaking. The intermediate mixture was hot rolled at 180 deg F. for 27 hours. The result was the free-flowing cement additive which did not stick to the walls of the glass container. The active liquid elastomer content was 35% by weight of free-flowing cement additive.

Example 4

In Example 4, the inert support was a commercially available precipitated silica, SIPERNAT® 22 from Evonik Corporation (Parsippany, N.J.). The high viscosity elastomer was a polybutadiene chain-end terminated with carboxylate groups. The commercially available aqueous latex was Verilok 552 (formerly Genceal CM 8400) available from OMNOVA SOLUTIONS (Beachwood, Ohio).

To two grams of the inert support in a glass container, 0.5 mL of the commercially available aqueous latex was added to obtain solid particles with poor particle size distribution as visually observed. To the solid particles, 1.08 g of the high viscosity elastomer was added with frequent shaking. This was then hot rolled at 180 deg F. for 27 hours. The result was a solid with a mixture of agglomerated material, unsuitable for use in cement blends. This method of preparing a high viscosity elastomer deposited on an inert support did not result in a free-flowing cement additive and the resultant product is unlikely to be suitable for use in cement compositions.

Example 5

In Example 5, the inert support was a commercially available precipitated silica, SIPERNAT® 22 from Evonik Corporation (Parsippany, N.J.). The high viscosity elastomer was polybutadiene chain-end terminated with carboxylate groups. The commercially available aqueous latex was Verilok 552 (formerly Genceal CM 8400) available from OMNOVA SOLUTIONS (Beachwood, Ohio). The commercially available anionic emulsifier was Latex Stabilizer-RS available from RITEKS Corporation (McKinney, Tex.).

To two grams of the inert support in a glass container, 0.5 mL of a mixture of the aqueous latex and the anionic emulsifier, at a weight ratio of 1 to 0.05, was added with shaking. To the resulting solid, 1.0 g of the high viscosity elastomer was added and then hot rolled at 180 deg F. for 27 hours. The result was a dry polymer with large chunks of agglomerated material. This method of preparing a high viscosity elastomer deposited on an inert support did not result in a free-flowing cement additive and the resultant product is unlikely to be suitable for use in cement compositions.

Example 6

Example 6 tested cement compositions with and without the free-flowing cement additives of Example 1. Sample 1 was a cement composition of 16.0 pounds per gallon (ppg) density prepared by mixing Class G Portland cement, water, and a free water reducing agent. The free water reducing agent was hydroxyl ethyl cellulose at a concentration of 0.063 percent by weight of cement. Sample 2 was prepared by adding the free-flowing cement additive prepared according to Example 1 to the cement composition of Sample 1, such that the concentration of the high viscosity elastomer in the cement slurry of Sample 2 was 1% by weight of cement. Sample 3 was prepared by adding the free-flowing cement additive prepared according to Example 1 to the cement composition of Sample 1, such that the concentration of the high viscosity elastomer in the cement slurry of Sample 3 was 2% by weight of cement. Each of the samples, Samples 1-3 were cured in an autoclaved under a pressure of 3000 pounds per square inch (psi) at 180 deg F. The tensile strength of each sample was measured by the Brazilian Split Cylinder test and the compressive strength was measured on Forney equipment under a load rate of 33 pounds force per second. The results of the tests are shown in Table 1.

TABLE 1

Properties of the samples of Example 6

| Sample # | Liquid Elastomer (% bwoc[1]) | Density (ppg) | Tensile Strength (TS) (psi) | Compressive Strength (CS) (psi) | CS to TS Ratio |
|---|---|---|---|---|---|
| 1 (Control) | 0 | 16.0 | 330 (average) | 4780 | 14.5 |
| 2 | 1 | 15.9 | 384 (average) | 4470 | 11.6 |
| 3 | 2 | 15.7 | 400 (average) | 3800 | 9.5 |

[1]% bwoc means % by weight of cement

The results in Table 1 show that the set cement compositions containing the free-flowing cement additive increased the tensile strength while decreasing the compressive strength when compared to Sample 1 with no free-flowing cement additive. When solid elastomeric materials are incorporated into set cement the compressive strength and tensile strength tend to be reduced, along with the Young's modulus, compared to cements without solid elastomeric materials, as expected when a soft phase (solid elastomeric phase) is incorporated into a hard and brittle phase (cement). Unexpectedly, the incorporation of the free-flowing cement additives, increased the tensile strength of the set cement compositions. Increased tensile strength is beneficial in cement compositions used in downhole cementing applications with annular geometry, because the increased tensile strength reduces the likelihood of cement failures due to tensile stresses. Additionally, increased tensile strength can reduce cement failures due to radial stresses, such as the production of radial cracks upon expansion of the casing diameter.

Example 7

Example 7 tested high viscosity elastomers containing liquid elastomers with a polar monomer grafted onto the low weight molecular monomer. The polar monomer was maleic anhydride which provided a polybutadiene with carboxylate groups grafted onto the polymer backbone.

The free-flowing cement additives were prepared using commercially available high viscosity elastomers incorporated on a silica support. Two commercially available high viscosity elastomers functionalized with maleic anhydride, available under the trade names RICOBOND® 1731 HS and RICOBOND® 1756 HS, available from Cray Valley (Exton, Pa.) were used. Each commercially available high viscosity elastomer is supported on a silica support. A comparative product containing a polybutadiene without maleic anhydride, available under the trade name RICON® 154 and supported on a silica support, was also tested to identify the effects of the carboxylate groups. The characterization data provided by the supplier of the commercially available elastomers is provided in Table 2.

TABLE 2

Characterization data of commercially available liquid elastomers

| Commercially Available Liquid Elastomer on Solid Support | Molecular Weight | Viscosity (cP) | Amount (%) of 1,2-Vinyl | Glass Transition Temp (deg C.) | % Maleic Anhydride | Inorganic Support | % Liquid Elastomer in Solid supported Elastomer |
|---|---|---|---|---|---|---|---|
| RICON 154 | 5200 | 250,000 at 25 deg C. | 90 | −15 | 0 | Hydrated amorphous silica | 65 |
| RICOBOND 1731 H5 | 5400 | 50,000 at 25 deg C. | 28 | −72 | 9 | Hydrated amorphous silica | 69 |
| RICOBOND 1756 H5 | 2500 | 140,000 at 25 deg C. | 70 | −18 | 3 | Hydrated amorphous silica | 69 |

Cement compositions containing the commercially available liquid elastomer in Table 2 were prepared according to the compositions in Example 6. In addition to the commercially available liquid elastomers, the cement compositions included a Class G cement; a settling prevention additive, FL-24 available from Fritz Industries (Mesquite, Tex.); a defoamer; D-Air 3000 available from Halliburton (Houston, Tex.); a cement dispersant containing sulfonate groups, SC-9 obtained from Fritz Industries (Mesquite, Tex.) and water.

In a first step, the commercially available liquid elastomer was dry blended with the cement along with the settling prevention additive. The dry blend was then mixed with the other components to produce a cement composition. The cement dispersant was added as needed to facilitate the production of a slurry. Each of the cement compositions was designed such that the solids-to-liquid (water) ratio was kept identical at 1.87, while allowing the density to vary. The cement compositions were poured into brass molds to prepare 1.5 inch diameter samples. The molds were cured in a water bath at 180 deg F. for 5 days at atmospheric pressure. The molds produced cylindrical cement samples. The tensile strength and compressive strength of the cylindrical cement samples was tested, as described in Example 6. The tensile strength was tested by the Brazilian Split Cylinder Test Method. Properties of the cement composition and the results of the strength tests are shown in Table 3.

TABLE 3

Properties of the cement compositions and cement discs

| Sample # | Commercially Available Liquid Elastomer | Liquid Elastomer, % bwoc | Slurry Density (ppg) | Tensile Strength (TS) (psi) | Compressive Strength (CS) (psi) | CS to TS Ratio |
|---|---|---|---|---|---|---|
| 4 | RICON 154 | 5.0 | 15.5 | 460 | 4980 | 10.8 |
| 5 | RICOBOND 1731 | 5.0 | 15.6 | 520 | 6110 | 11.8 |
| 6 | RICOBOND 1756 | 5.0 | 15.6 | 530 | 5780 | 10.9 |

The results in Table 3 show that tensile strengths and compressive strength increased with the use of liquid elastomers functionalized with maleic anhydride compared to the liquid elastomers that did not contain the functional groups.

As a result of the tensile strength tests, the cement discs were split in half. The split halves of the cement discs were wrapped in an aluminum foil and held together tightly in a C-clamp and kept in an oven at 200 deg F. for three days. The samples were allowed to cool to room temperature. The cement discs were then tested to see if sufficient adhesion occurred to hold the halves together under applied hand pressure. The cement disc from Sample 4 was not healed and the cylinder halves could be separated easily. The cement disc from Sample 5 offered some resistance before it split open along the preexisting crack. The cement disc from Sample 6 was healed with sufficient adhesion such that it could not be pulled apart with applied hand pressure.

The study suggests that liquid elastomers, particularly those provided with cement-bonding functional groups, depending on their structure can serve to seal failed cement zones, seal fractures, and prevent flow of undesired fluids, such as gas, water or hydrocarbon from communicating with undesired zones. Advantageously, the presence of the free-flowing cement additive provides the ability to prevent gas pressure build up behind casings or at well head. The presence of the free-flowing cement additive can modify the cement mechanical properties favorably by reducing the brittleness of the set cement.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context unequivocally dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That which is claimed is:

1. A method of making a cement slurry for downhole cementing applications, the method comprising the steps of:
blending an amount of a free-flowing cement additive with a cement to form a dry cement mix, where the free-flowing cement additive comprises:
a high viscosity elastomer, the high viscosity elastomer having a viscosity between 50,000 cP and 300,000 cP at room temperature, where the high viscosity elastomer comprises a liquid elastomer, where the liquid elastomer comprises a low molecular weight polymer having molecular weights in the range of 1,000 to 250,000 Daltons (Da), where the low molecular weight polymer comprises butadiene; and
an inert support, where the high viscosity elastomer is deposited on the inert support, where the inert support is selected from the group consisting of sand, quartz, amorphous silica, alumina, clay, fly ash, minerals, salts, and combinations of the same; and
mixing the dry cement mix with an aqueous fluid to form the cement slurry.

2. The method of claim 1, where the cement is selected from the group consisting of Portland cements, high alumina cements, magnesia cements, pozzolanic cements, and slag cements.

3. The method of claim 1, where the cement slurry further comprises a cement additive selected from the group consisting of a set retarders or accelerators, fluid loss control agents, gas migration control additives, settling prevention addition additives, strength retrogression prevention additives, mechanical property modifiers, fibers, foaming agents, defoamer additives, and combinations of the same.

4. The method of claim 1, where the low molecular weight polymer comprises polar groups selected from the group consisting of polar monomers, polar functional groups, and combinations of the same.

5. The method of claim 4, where the low molecular weight polymer comprises polar monomers selected from the group consisting of acrylonitrile, maleic anhydride, vinyl acetate, and combinations of the same.

6. The method of claim 5, where the polar monomer is incorporated into a backbone of the low molecular weight polymer.

7. The method of claim 5, where the polar monomer is grafted onto a backbone of the low molecular weight polymer.

8. The method of claim 4, where the low molecular weight polymer comprises the polar functional group selected from the group consisting of carboxylate groups, hydroxyl groups, carboxy anhydride groups, ester groups, sulfonate groups, phosphonate groups, and combinations of the same.

9. The method of claim 8, where the low molecular weight polymer is chain-end terminated with the polar functional group.

10. The method of claim 1, where the free-flowing cement additive further comprises a supplemental component selected from the group consisting of an anionic emulsifier, a hydrocarbon solvent, and combinations of the same.

11. The method of claim 1, where the free-flowing cement additive comprises a median particle size (D50) distribution of less than 500 microns.

12. A method of using a cement slurry in a downhole cementing application, the method comprising the steps of:
blending an amount of a free-flowing cement additive with a cement to form a dry cement mix, where the free-flowing cement additive comprises:
a high viscosity elastomer, the high viscosity elastomer having a viscosity between 50,000 cP and 300,000 cP at room temperature, where the high viscosity elastomer comprises a liquid elastomer, where the liquid elastomer comprises a low molecular weight polymer having molecular weights in the range of 1,000 to 250,000 Daltons (Da), where the low molecular weight polymer comprises butadiene; and
an inert support, where the high viscosity elastomer is deposited on the inert support, where the inert support is selected from the group consisting of sand, quartz, amorphous silica, alumina, clay, fly ash, minerals, salts, and combinations of the same;
mixing the dry cement mix with an aqueous fluid to form the cement slurry;
placing the cement slurry in a wellbore in the downhole cementing application; and
allowing the cement slurry to set to form a hardened cement.

13. The method of claim 12, where the downhole cementing application is selected from the group consisting of primary cement operations, annulus sealing operations, and combinations of the same.

\* \* \* \* \*